(12) United States Patent
Banerjee et al.

(10) Patent No.: US 11,789,963 B2
(45) Date of Patent: Oct. 17, 2023

(54) SYSTEMS AND METHODS FOR PRESENTING WEB APPLICATION CONTENT

(71) Applicant: Capital One Services, LLC, McLean, VA (US)

(72) Inventors: Sayak Banerjee, Allen, TX (US); Justine Thomas, Lewisville, TX (US)

(73) Assignee: Capital One Services, LLC, McLean, VA (US)

( * ) Notice: Subject to any disclaimer, the term of this patent is extended or adjusted under 35 U.S.C. 154(b) by 286 days.

(21) Appl. No.: 17/205,496

(22) Filed: Mar. 18, 2021

(65) Prior Publication Data

US 2022/0300524 A1    Sep. 22, 2022

(51) Int. Cl.
  *G06F 16/00*   (2019.01)
  *G06F 16/25*   (2019.01)
  *G06F 16/955*  (2019.01)
  *G06F 16/958*  (2019.01)

(52) U.S. Cl.
  CPC .......... *G06F 16/252* (2019.01); *G06F 16/955* (2019.01); *G06F 16/958* (2019.01)

(58) Field of Classification Search
  CPC ....... G06F 16/25; G06F 16/958; G06F 16/955
  See application file for complete search history.

(56) References Cited

U.S. PATENT DOCUMENTS

| | | | |
|---|---|---|---|
| 10,567,543 B1 * | 2/2020 | Boodman | G06F 21/57 |
| 10,613,713 B2 * | 4/2020 | Ozuysal | G06F 3/0483 |
| 2007/0136417 A1 * | 6/2007 | Kreiner | H04L 67/02 |
| | | | 707/E17.111 |
| 2010/0262678 A1 | 10/2010 | Morgan et al. | |
| 2012/0054313 A1 * | 3/2012 | Williams | G06F 16/00 |
| | | | 709/219 |
| 2015/0278171 A1 | 10/2015 | Lefebvre et al. | |
| 2016/0210362 A1 * | 7/2016 | Kapadia | G06F 16/9535 |
| 2017/0034306 A1 | 2/2017 | Thangeswaran | |
| 2018/0121559 A1 * | 5/2018 | Bare | G06F 16/252 |
| 2019/0303500 A1 | 10/2019 | Mathews | |
| 2020/0218532 A1 * | 7/2020 | Hari Krishnan | H04L 67/75 |

FOREIGN PATENT DOCUMENTS

CN        110928545 A    3/2020

* cited by examiner

*Primary Examiner* — Cheryl Lewis
(74) *Attorney, Agent, or Firm* — Bookoff McAndrews, PLLC (57) ABSTRACT

Systems and methods are disclosed for presenting web application content. A method for presenting web application content includes executing a web application using a web browser, the web application configured to display a web page element in a web browser. The method includes identifying an application component requested by a user action. The method also includes querying a component registry database for the application component, the component registry database including one or more application components loadable by the web application. The method then includes obtaining, from a link in the component registry database, application component code for the application component. The method also includes incorporating the application component code into the web page element. The method also includes rendering the application component code and the web page element using the web browser so that the application component is displayed in the web browser as part of the web page element.

20 Claims, 6 Drawing Sheets

SYSTEMS AND METHODS FOR PRESENTING WEB APPLICATION CONTENT

TECHNICAL FIELD

Various embodiments of the present disclosure relate generally to the presentation of web applications and, more particularly, to the presentation of web applications using a component registry.

BACKGROUND

For websites that include multiple web applications, which may provide different functionalities to a user, it is often desirable to maintain consistency in the look and feel of the website when the user navigates from one web application to another within the website. A common landing portal may provide a common header, footer, sidebar, and/or other interface element to maintain a consistent look and feel. However, different application development teams may develop their own respective applications and/or application components to be used in the website. Each team must contribute their code to a common platform in order to build the website. The common platform may build the website using the code from the various teams for the different applications and/or application components. However, developing and releasing applications in such a way is time consuming as the common platform may need to run testing and release cadences to ensure the code from the various teams is compatible and deployable. Thus, processing speeds and times for the website may be slow. Further, developing applications in such a way may be costly due to having to coordinate between multiple teams making changes to the same application.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for presenting web application content.

In one embodiment, a method for presenting web application content is disclosed. The method includes: executing a web application using a web browser, the web application configured to display a web page element in a web browser; identifying an application component requested by a user action; querying a component registry database for the application component, the component registry database including one or more application components loadable by the web application; obtaining, from a link in the component registry database, application component code for the application component; incorporating the application component code into the web page element; and rendering the application component code and the web page element using the web browser so that the application component is displayed in the web browser as part of the web page element.

In another embodiment, a method for presenting web application content is disclosed. The method includes: executing a web application using a web browser, the web application configured to display a web page element in a web browser; identifying one or more application components requested by a user action, the one or more application components including one or more micro-applications and/or one or more micro-frontends; querying a component registry database for the one or more application components, the component registry database including a list of one or more application components loadable by the web application, wherein each respective application component of the list includes one or more attributes associated with the respective application component; obtaining, from a link in the component registry database, application component code for each of the one or more application components; incorporating the application component code for each of the one or more application components into the web page element; and rendering the application component code and the web page element using the web browser so that the one or more application components are displayed in the web browser as part of the web page element.

In yet another embodiment, a computer system for presenting web application content is disclosed. The computer system includes: a memory storing instructions; and one or more processors configured to execute the instructions to perform operations. The operations include: receiving, from a client device, a page load request; transmitting, to the client device, a web application, the web application being executable in a web browser of the client device, the web application configured to display a web page element in a web browser, wherein the web application, when executed in the web browser of the client device, configures the client device to identify a application component when the application component is requested by user action performed by a user of the web browser; receiving, from the client device, a query of a component registry database for the application component, the component registry database including one or more application components loadable by the web application; and transmitting, to the client device, application component code for the application component from a link in the component registry database, wherein the web application, when executed in the web browser of the client device, further configures the client device to: incorporate the application component code into the web page element; and render the application component code and the web page element using the web browser so that the application component is displayed in the web browser as part of the web page element.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, a web application running in a web browser may retrieve code for application components for the web application from a component registry database. Thus, the web application may build itself at runtime by pulling in the necessary code from the component registry database. The application components may include micro-frontends and/or micro-applications. As used herein "micro-frontends" and "micro-applications" are small pieces of a web application. For example, micro-frontends and micro-applications may be a single workflow of the web application, a single feature of the web application, or a single widget of the web application. Micro-applications may consist of one or more micro-frontends. Further, micro-frontends and micro-applications can be independently developed and deployed by separate development teams. Micro-frontends and micro-applications may be complimentary such that, when combined together, the micro-frontends and/or micro-applications form a feature-rich web application.

Accordingly, the application components may be developed and deployed individually (e.g., by different development teams) via a server system. The code for the application components may be stored by the server system. A link (e.g., a bundle URL) for the source code may be included in the component registry database such that the web application may access the code for a respective application component via the link in the component registry database and load the code from the server system. The component registry database may include a user interface including a list of one or more application components that are included in the component registry database. Development teams can utilize existing application components in the component registry database and list new application components in the component registry database (e.g., including a link to the code for the respective new application component). As detailed below, the component registry database may include rules or properties for the respective application components that determine whether the web application may use a respective application component. In other words, the component registry database may define permitted application components that may be used by the web application at runtime. For example, a web application may request access to an application component, and an owner (e.g., development team) of the application component may grant, or permit, the web application to use the application component. Accordingly, development time of the website may be reduced and processing speed of the web application may be increased by utilizing the component registry database of the present disclosure.

The embodiments of the present disclosure may also provide additional benefits. The present disclosure may allow configuration based deployments. For example, a development team may configure a certain geographic population to see a specific version of an application component (e.g., a micro-frontend). Similarly, the development team may configure a team of beta users to see a new version of the application component relatively easily compared to prior art systems. Further, the component registry database may be used to serve specific versions of a respective application component to a certain demographic. For instance, a high contrast screen reader-enabled version of the application component may be served to visually impaired users. The component registry database may also be used to rapidly revert to an older (e.g., stable) version of the application component if there are any defects detected with a newer version.

The component registry database may allow a marketplace culture where development teams may discover fully built out business applications for their organization that a respective team or group of users can simply plug in their own application. For example, a first development team may develop a first application component and a second development team may utilize the first application in their respective web application. Thus, the component registry database may provide for reuse of application components among various different web applications.

Further, the system architecture of the present disclosure may allow building progressive web applications (PWAs). PWAs may include web pages that run on mobile devices and function as a native mobile application. Thus, a mobile application team may build a slim mobile application that may reference the component registry database to load a respective application component, as detailed above. Lastly, the present disclosure may allow deterministic (e.g., semantic) updates. For example, the application components may clearly document the data the respective application component requires in the component registry database. Therefore, the developers may choose to upgrade to a newer version with zero changes if it is a non-breaking change (e.g., minor version change). Thus, the present disclosure may provide for reduced testing time and higher stability.

Figure 1:
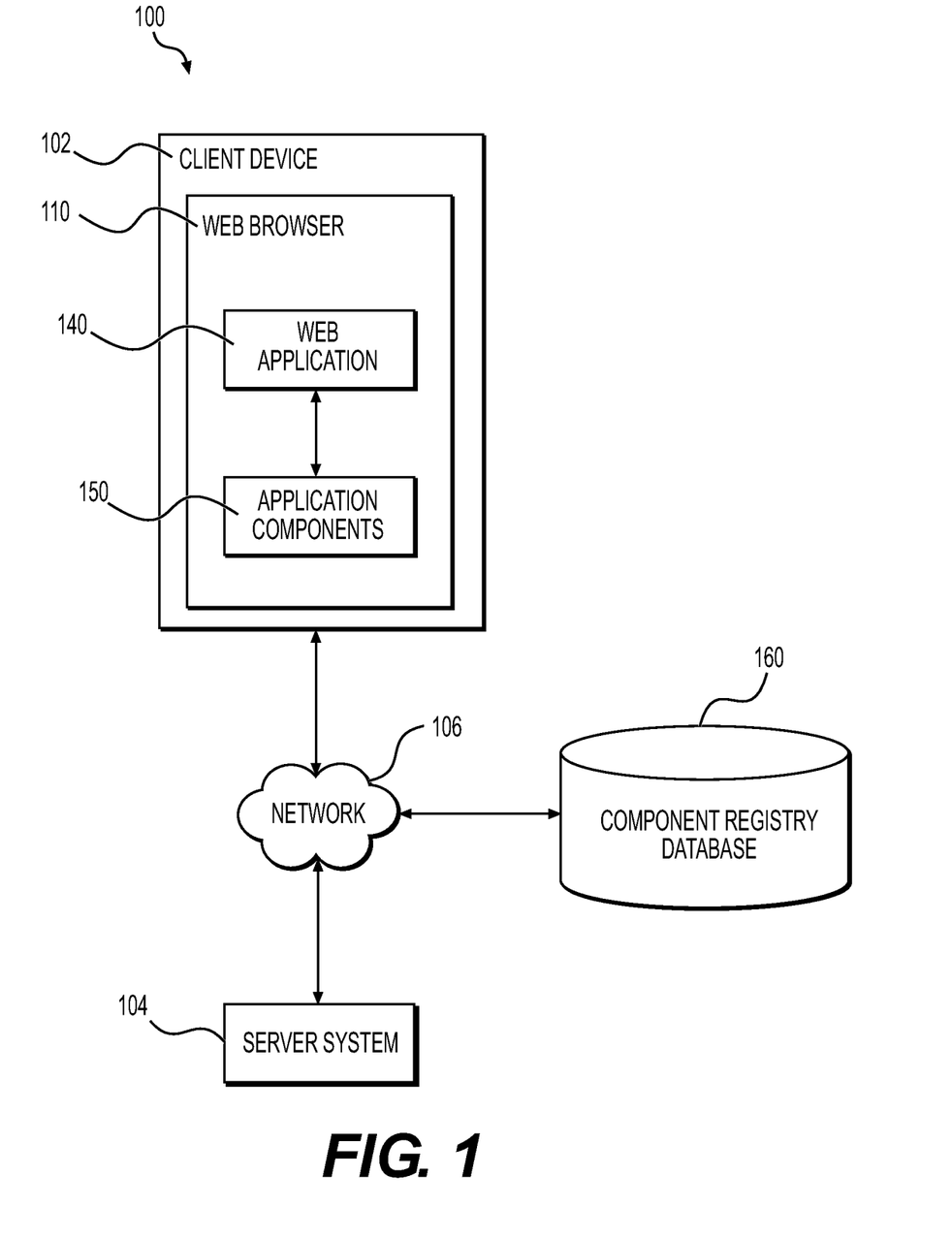
FIG. 1 depicts an exemplary system infrastructure for presenting web application content, according to one or more embodiments.

Referring now to the drawings, FIG. 1 illustrates a system infrastructure 100 for presenting web application content, according to one or more embodiments of the present disclosure. System infrastructure 100 may include a client device 102 and a server system 104. Client device 102 and server system 104 may communicate with each other through a communication network 106.

Client device 102 may execute a web browser 110 in which web applications can be run. Web browser 110 may be said to be running a web application if it runs the client-side component elements of the web application, even if the web application includes, utilizes, or otherwise involves server-side elements that are run on server system 104. In this disclosure, the term "run" is used interchangeably with "execute."

Web browser 110 may run web applications provided by server system 104. Such web applications may include one or more web applications 140 including one or more application component(s) 150, as shown in FIG. 1. As will be discussed in more detail below, web applications 140 may provide functionalities for web content navigation, and may display a frontend of application components 150 based on a user command received by the web browser 110.

Server system 104 may store web applications 140 and other applications in a memory of the server system 104. Application components 150 (e.g., code for the application components 150) may also be stored by server system 104 and referenced (e.g., via a link) in a component registry database 160, as detailed further below. It is understood that component registry database 160 and/or portions of component registry database 160 may be stored in the memory of server system 104. Further, component registry database 160 may include one or more databases. Application components 150 may include micro-frontends, micro-applications, components of micro-frontends and/or micro-applications, and/or any other types of application components.

Server system 104 may provide such web applications 140 to client device 102 upon receiving a request from client device 102. For example, server system 104 may execute a web server, which may receive a request sent by web browser 110 to access a particular web application. Upon receiving the request, the web server may invoke an appropriate web application server that services that particular web application. The web server may retrieve, from the web application server, data that is to be provided to web browser 110. Such data may include computer code (e.g., HTML, CSS, JavaScript, and/or media content) that is executable by the web browser 110 to run the client-side components of the web application. For example, the web server may retrieve code for a particular application component 150 from the component registry database 160, as further detailed below. The web server may also provide data that is used by the web application when the web application is running in web browser 110.

Client device 102 may be any suitable computer system. For example, client device 102 may be a desktop or laptop personal computer, or a mobile computing device such as a smartphone, tablet, or wearable computing device. Similarly, server system 104 may be any suitable computer system. For example, server system 104 may have a cloud-computing platform having scalable resources for computation and/or data storage and may perform any of the functionalities of the server system 104 on the cloud computing platform. Communication network 106 may be, for example, the Internet, or a combination of private and/or public network(s).

Figure 2A:
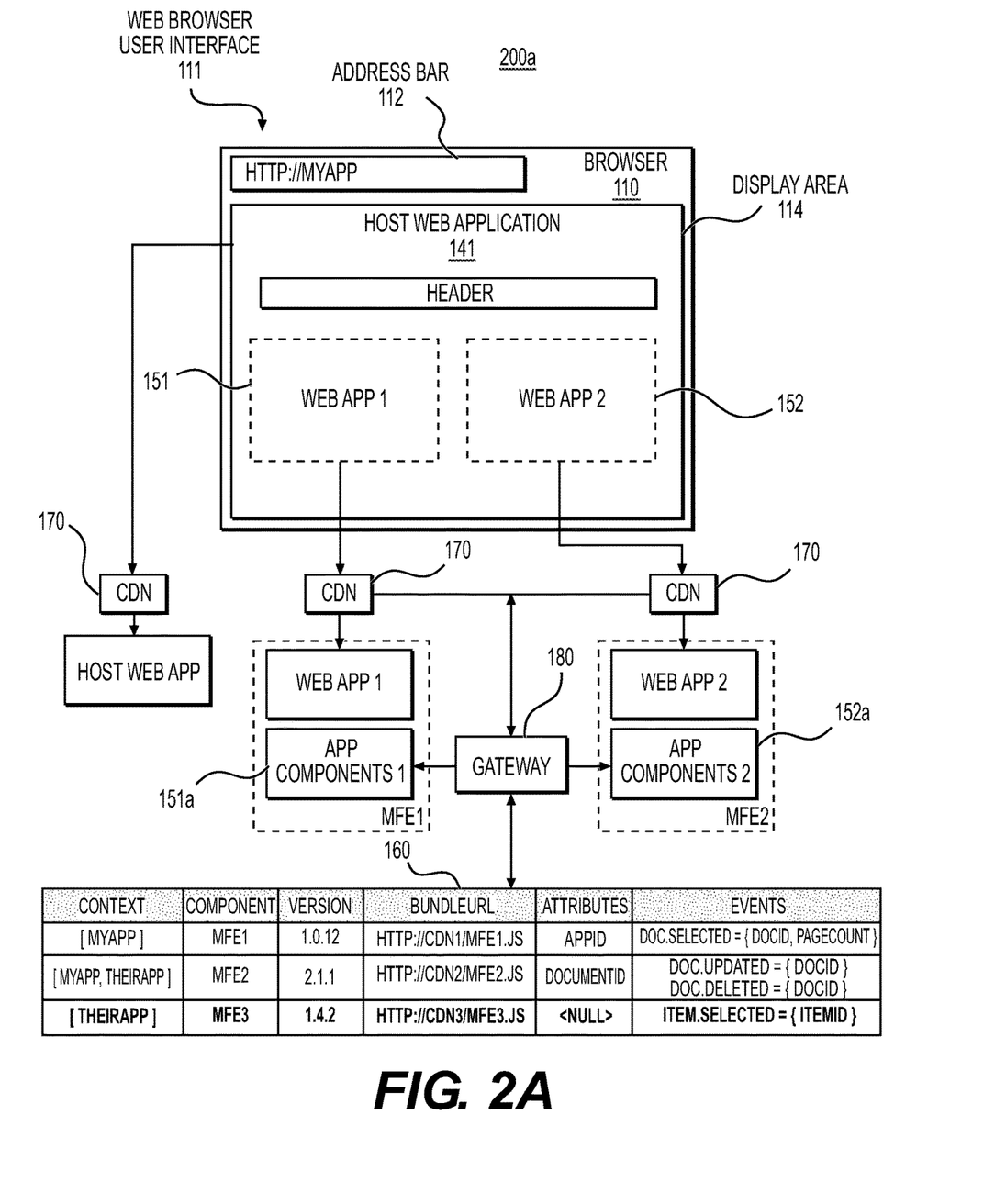
FIGS. 2A-2C illustrate various embodiments of a web browser interface and the presentation of content in the web browser interface.
Figure 2B:
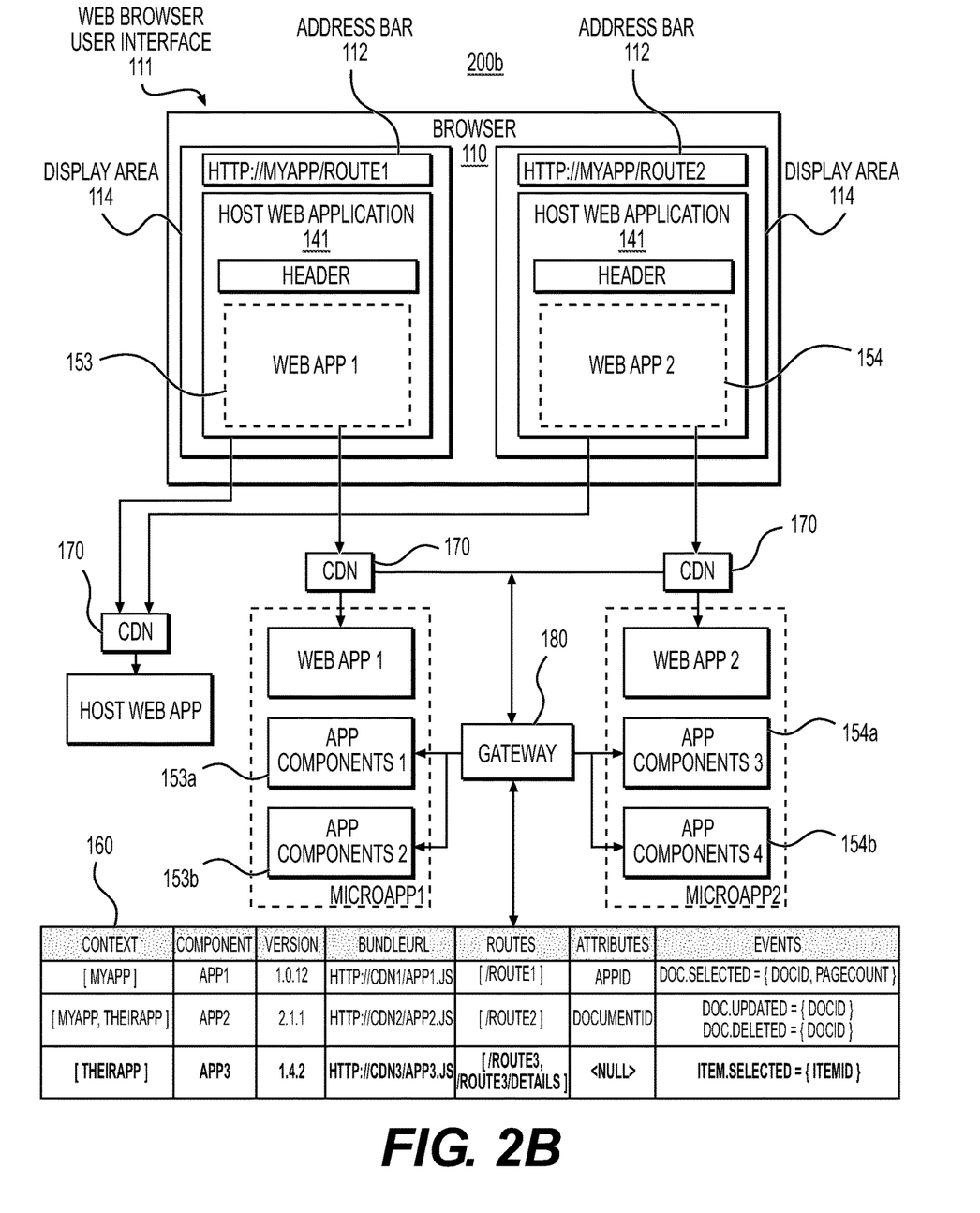
Figure 2C:
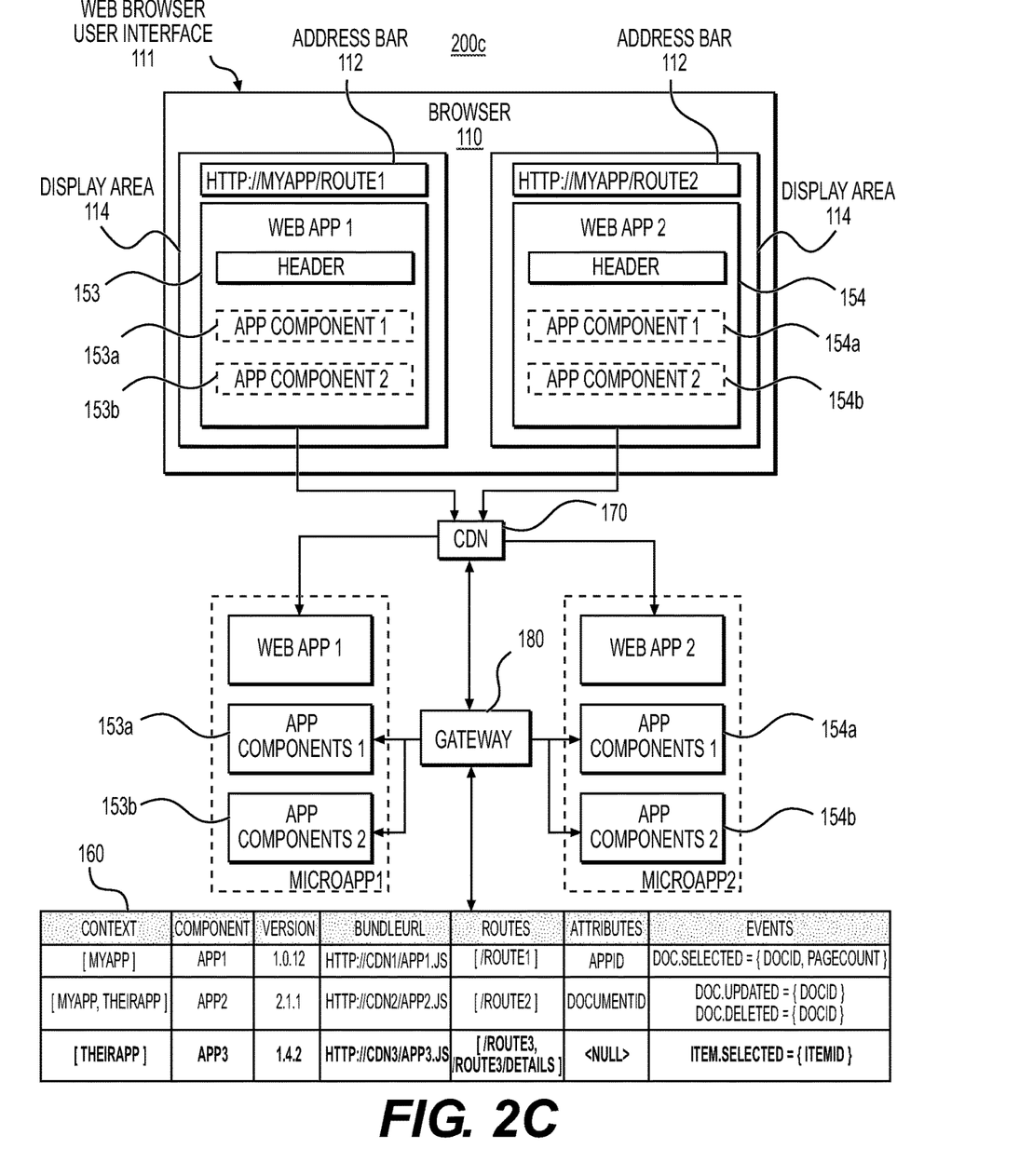

FIGS. 2A-2C illustrate various embodiments of a web browser user interface 111 of web browser 110, and the presentation of content in the web browser user interface 111. FIG. 2A illustrates a first embodiment of an exemplary architecture 200a of web application 140, FIG. 2B illustrates a second embodiment of an exemplary architecture 200b of web application 140, and FIG. 2C illustrates a third embodiment of an exemplary architecture 200c of web application 140. As shown in FIGS. 2A-2C, web browser user interface 111 may include an address bar 112 and a display area 114. It is noted that FIGS. 2B and 2C include two address bars 112 to illustrate two different routes, as detailed below. Web browser user interface 111 may be presented as a screen that is displayed on an electronic display (e.g., a monitor or touchscreen) of client device 102. Display area 114 may display contents of a web application 140 or other website loaded in web browser 110. Web browser user interface 111 may have additional user interface elements, such as a back button, a forward button, a refresh button, a search bar, and/or a menu bar; however, such elements are omitted from the figure for purposes of clarity.

The exemplary architectures 200a-200c may also include one or more content delivery networks (CDN) 170 and a gateway 180 for communicating with back end servers (e.g., server system 104) that host components of the web application 140. The content delivery networks 170 may include a geographically distributed network of proxy servers and data centers to provide high availability and performance by distributing services spatially relative to end users. The gateway 180 may include a data exchange gateway that includes a registry for APIs and streams that allow communication between frontend components and back end components of web application 140. It is understood that architectures 200a-200c may include any number and any type of communication components for allowing communication between the frontend components and the backend components of the web application 140.

When run in web browser 110, web applications 140 may display a frontend of a host web application 141 (FIGS. 2A and 2B) and/or other user interface components in display area 114. The host web application 141 may include common interface components between various web applications, such as, for example, headers, footers, and the like. Host web application 141 may include one or more child web applications 151, 152, 153, 154, such as a micro-application and/or a micro-frontend. For example, after providing an initial web page document to the web browser 110 in response to a page load request received from the web browser 110, web application 140 may be updated dynamically without requiring the web browser 110 to load an entirely new page. The dynamic update of the web application 140 may be performed using, for example, Asynchronous JavaScript and XML (AJAX) and/or other JavaScript-based techniques. In some embodiments, such as the embodiment in FIG. 2C, the architecture 200c may not include a host web application 141. In such embodiments, the child web applications 153, 154 may provide various headers, footers, navigation, and/or other common elements themselves.

As shown in FIGS. 2A-2C, web application 140 may include a viewing area in which content displayed by web browser 110 is updated by the host web application 141. For example, web application 140 may display one or more application components 150, such as one or more child web applications 151-154, on the web browser's 110 display area 114. In the embodiment of FIG. 2A, the child web applications 151, 152 may include micro-frontends and various application components 151a, 152a. In the embodiments of FIGS. 2B and 2C, the child web applications 153, 154 may include micro-applications and various application components 153*a*, 153*b*, 154*a*, 154*b*. In the application architecture described above, the web application 140 (e.g., via the host web application 141) may replace the child web application 151-154 that is currently being displayed in display area 114 with another one (e.g., a different one) of the one or more child web applications 151-154, in response to a user interaction with the web browser 110 or the web application 140. As shown in FIG. 2A, web application 140 may also display multiple child applications 151-152 at a time, as needed. In the embodiments of FIGS. 2B and 2C, the child web applications 153-154 may be different routes of the web application 140, as detailed further below. It is noted that display area 114 may have any suitable shape or layout and may have any suitable position with respect to other portions of the host web application 141. Display area 114 may be defined by a web page element, such as a Document Object Model (DOM) element of the web application 140. Further, while two child web applications 151-154 are shown in the embodiments of FIG. 2A-2C, it is understood that host web application 141 may display any number of child web applications 151-154, as necessary. For example, the child web applications 151-154 may include a first child web application, a second child web application, a third child web application, etc.

The one or more child web application 151-154 may each include a frontend of the respective child web application 151-154. For example, as shown in FIG. 2A, the child web applications 151, 152 may include a micro-frontend. Similarly, as shown in FIGS. 2B and 2C, the child web applications 153, 154 may include a micro-application. Each of the one or more child applications 151-154 may be loaded from server system 104 (via a link in the component registry database 160), and any one of which, or components thereof, may serve as an example of application components 150 described above in connection with FIG. 1. Thus, the one or more child web applications 151-154 may respectively provide frontends, or user interface (UI) components, any one of which may be displayed in the viewing area of the web application 140.

In general, a UI component or frontend (e.g., of application components 150), may include any suitable content, such as text, images, videos and/or other media. A UI component may include interactive elements (e.g., clickable links or other interactive graphical user interface elements), which may respond to user-interaction events detected by the web browser 110, such as mouse events (e.g., mouse clicks, mouse movement, etc.). Interactive elements may include, for example, elements that a user may interact with to trigger a request (e.g., an AJAX request) that is sent by the web browser 110 to the server system 104. An application, such as web application 140 or any of the child applications 151-154, may provide a UI component by, for example, defining the UI component and instructing web browser 110 to display the UI component when the respective child application is executed by web browser 110.

The particular content of a UI component may depend on the purpose of the application providing the UI component. In some embodiments, web application 140 may be a portal application, in which case the host web application 141 may have portal application functionalities for navigating between pages and/or web application functionalities. For example, the web application 140, host web application 141, and child web applications 151-154 may collectively constitute a website. In the instant example, UI components provided by child web applications 151-154, respectively, may be different sections of the website (e.g., different sections with different user interaction functionalities), and the frontend of web application 140 and/or host web application 141 may include an interface by which the user may navigate between the different sections. Host web application 141 may include common website layout components that are viewed regardless of which of the different sections is being displayed. For example, host web application 141 may include a header, footer, sidebar, and/or other web page layout element that is commonly displayed regardless of which child web application is being displayed.

In the embodiment of FIG. 2A, the child web applications 151, 152 may be dynamically loaded as detailed above. For example, when the host web application 141 is loaded, the host web application 141 may retrieve the child web applications 151, 152 from server system 104 via a link for the respective child web applications 151, 152 in component registry database 160 that are needed to be displayed for a particular context. As the user interacts with the web application 140, the host web application 141 may determine a new or different child application is needed to be displayed. Host web application 141 may then dynamically update the child web applications 151, 152 with the new or different child web applications from the server system 104 (e.g., via a respective link in the component registry database 160) based on the user interaction. In this embodiment, the host web application 141 may load the code for the respective child web application 151, 152 and may instantiate the code within the DOM for the host web application 141. In some embodiments, the host web application 141 may utilize a module discovery service, such a bootstrapping service, such that the child web application 151, 152 is loaded in the host web application 141. The module discovery may occur once (e.g., during bootstrapping of the web application 140) and/or may occur at periodic intervals based on a respective deployment strategy and a level of complexity of the web application 140.

In some embodiments, web application 140 may determine a particular child web application 151-154 to be displayed in display area 114 in web browser 110 based on an identifier received from the web browser 110. As shown in FIGS. 2B and 2C, such an identifier may be a URL indicative of both web application 140 and/or host web application 141 and a particular child web application 153-154. Such a URL is represented in FIGS. 2B and 2C by the expression "http://myapp/route1" and "http://myapp/route2", where "myapp" represents a hostname or other identifier of web application 140 and/or host web application 141, and "route1" and "route2" represents an identifier of a particular child web application 153-154, respectively, requested by the user to be displayed in web browser 110. That is, a portion of the URL may include an identifier of a particular child web application. The hostname may be in any suitable format, such as "www.myapp.com". The child application identifier may be in any suitable format. In the example shown in FIGS. 2B-2C, the child application identifier is a set of characters following a forward slash. In other examples, the child application identifier may include a URL fragment preceded by a hash tag (#) symbol (e.g., "#route1" for one of the child applications 153-154 and "#route2" for another one of the child applications 153-154).

When the user operates web browser 110 to navigate to the aforementioned URL (e.g., by activating a link or typing the URL into the address bar 112), if the web application 140 and/or the host web application 141 indicated by the URL has not yet been loaded in the web browser 110, web browser 110 may transmit a page load request to server system 104. Server system 104 may then provide the host web application 141 to be loaded in web browser 110. If the web application 140 and/or the host web application 141 indicated by the URL has already been loaded in web browser 110, the web application 140 and/or the host web application 141 may receive the URL when user operates web browser 110 to navigate to the URL.

When web application 140 and/or host web application 141 has been loaded in web browser 110, web application 140 and/or host web application 141 may read the URL to determine, based on the child application identifier indicated by the URL, the particular child web application 151-154 corresponding to the child application identifier. The web application 140 and/or host web application 141 may search the component registry database 160 for the link or reference to the corresponding child web application code, as detailed below. In the embodiment of FIG. 2B, the child web application 153-154 may be dynamically loaded into the existing DOM of the host web application 141. For example, a portion of the DOM of the host web application 141 may be replaced. In the embodiment of FIG. 2C, the child web application 153-154 may provide a complete DOM (e.g., including headers, footers, navigation, etc.) such that the DOM of the child web application 153-154 serves the entire DOM of the web application 140. The corresponding child web application 153-154 of the determined child web application may then be displayed in display area 114. For example, if the child application identifier corresponds to child web application 153, then the web application 140 and/or host web application 141 may display a frontend of child web application 153 in the viewing area. If the identifier instead corresponds to child web application 154, then the web application 140 and/or host web application 141 may display a frontend of child web application 153 in the viewing area.

In order for web application 140 and/or host web application 141 to display the child web application 151-154 corresponding to a particular child web application, web application 140 and/or host web application 141 (e.g., via server system 104) may retrieve executable code from server system 104 (e.g., via a link in component registry database 160) that is usable by client device 102 to render the child web application 151-154. In general, the executable code for any child web application 151-154 may be loaded onto the client device 102 at any suitable time. For example, it is possible for all of the plurality of the child web applications 151-154 to be loaded onto the client device 102 during the initial page load. In this case, when one of the frontends or UI components of the child web application 151-154 is to be displayed in the viewing area, the web application 140 and/or host web application 141 may display the UI component without having to retrieve the corresponding child web application 151-154 from component registry database 160 on demand.

Server system 104 may be configured to provide services for user-interaction functionalities of the respective frontend or UI component, such as the processing (e.g., creating, reading, updating and/or deleting) of data according to user interactions input through the UI component. For example, a user of the web browser 110 that is using child web application 151 may trigger an action resulting in an AJAX request being transferred from the web browser 110 to server system 104. The content of the AJAX request may be provided to the appropriate child web application 151-154. For example, if the user uses a functionality of the UI component that is serviced by child web application 151, the content of the AJAX request may be provided to child web application 151 servicing the functionality.

To display a respective child web application 151-154, web application 140 and/or host web application 141 may obtain web application code for the respective child web application 151-154 from the server system 104 (e.g., via the link in component registry database 160). The component registry database 160 may include a link (e.g., a URL) to the code for various child web applications 151-154. As detailed above, the component registry database 160 may include a database of child web applications and various attributes and/or properties for the respective child web applications 151-154. For example, the component registry database 160 may include sections for context, component, version, a link to code for the child application (e.g., a bundle URL), routes (FIGS. 2B and 2C), attributes, and/or events.

The "context" section may include a list of the web applications 140, host web applications 141, and/or micro-applications (e.g., child web applications 153, 154) that may use a particular application component 150. For example, "myapp" may be a first web application 140, host web application 141, and/or micro-application developed by a first development team, and "theirapp" may be a second web application 140, host web application 141, and/or micro-application developed by a second development team different than the first development team. If the application component 150 is a micro-frontend, the "context" section may indicate whether the application component 150 is to be used for a host web application 141 and/or a child web application 153, 154 (e.g., micro-application). If the application component 150 is a micro-application, the "context" section may indicate that the application component 150 is to be used for a web application 140 and/or host web application 141. Accordingly, the "context" section may allow a whitelist of which types of web applications 140 (e.g., host web application 141 and/or micro-application) are able, or permitted, to load the respective child web application 151-154. This may prevent unauthorized loading of a respective child web application 151-154 without the knowledge of the respective development team that built the respective child web application 151-154. In the exemplary embodiment of FIGS. 2A-2C, application components 150 that are not permitted (e.g., "theirapp") appear in bolded text, while application components 150 that are permitted (e.g., "myapp" and "myapp, theirapp") appear non-bolded. It is understood that the use of bolded text in FIGS. 2A-2C is used as illustrative only to distinguish between permitted and non-permitted components, and appearance-based distinctions between permitted and non-permitted components may not exist. For example, the list of application components 150 may appear in the same or similar typeface regardless of permitted status.

The "component" section may describe, or otherwise provide, an alias for the components (e.g., micro-front ends, micro-applications, etc.) of the respective child web application 151-154. For example, the components may include micro-frontends (MFEs) 1-3 in FIG. 2A, and micro-applications 1-3 in FIGS. 2B and 2C. The "component" section may also include a list of the specific application components 151a, 152a, 153a, 153b, 154a, 154b of each respective child web application 151-154.

The "version" section may describe which version of the respective child web application 151-154 is listed. In some embodiments, the component registry database 160 may include more than one version (e.g., a plurality of versions) of a respective application component 150. The different versions may be permitted for use by different web applications 140. For example, a first web application 140 may load a first version of a child web application 151-154 and a second web application 140 may load a second version of the child web application 151-154. The second version may be different than the first version. The "attributes" and "events," described below, for each of the different versions of an application component 150 may be different. The application version may be semantically incremented to indicate breaking change, where the contract (e.g., data elements and/or formats) of the application component 150 changes. For example, a "major" version change may go form version 1 to version 2 indicating that the contract changed. A "minor" version change can be, for example version 1.3 to version 1.4, indicating no change in contract. This versioning may be used to determine if the web application 140 and/or host web application 141, or the child web applications 151-154, require code changes to incorporate the new version of the respective application component 150.

The "bundle URL" section may include the link (e.g., URL) for accessing the code and/or bundle of the respective child web application 151-154 that is to be inserted in the DOM of the host web application 141, as detailed above. For example, bundling may include packaging all files (e.g., JavaScript files) of the respective child web application 151-154 into a single file. Accordingly, the link may include a link to the bundle such that when a bundle is added or otherwise loaded into the web application 140, as detailed above, all the files are added or loaded, as well as the corresponding HTML, CSS, and other assets for the website.

The "routes" section (FIGS. 2B and 2C) may include the URL routes for the respective component. For example, the web application 140 and/or the host web application 141 may use the URL route for a respective child web application 151-154 to determine which child web application 151-154 to load for a respective user request, as detailed above.

The "attributes" section may include a list of data elements and formats (e.g., contracts) in which the data elements may be passed to the respective application component 150. For example, the "attributes" section may contain data elements, such as an application id, a document id, etc., which may be used as needed by the respective child web application 151-154. Accordingly, the "attributes" section determines how data is passed from web application 140 and/or host web application 141 to the respective child web application 151-154.

The "events" section may describe various events associated with the respective child web application 151-154. For example, the "events" section may describe how data is passed out of the application component 150 back to the web application 140 and/or host web application 141. The "events" may leverage the web browser's 110 native custom events functionality. For example, the web application 140 and/or host web application 141 may subscribe to the browser events and can asynchronously receive data yielded by the application components 150.

It is understood that the component registry database 160 is not limited to the information shown in FIGS. 2A-2C and may include any information necessary for describing attributes and/or properties of a respective child web application 151-154. For example, the component registry database 160 may include information of child web applications 151-154 that allow the host web application 141 to discover: which user interface components the web application 140 and/or host web application 141 is allowed to load (e.g., the "context"); which versions of the child web applications 151-154 are available for consumption (e.g., the "version"); the link (e.g., URL) to the source code of the UI components (e.g., the "bundleURL"); how to pass data into the child web applications 151-154 (e.g., the "attributes") (e.g., the web app may want to pass an account number to a payments UI component); how the child web application 151-154 passes data back (e.g., the "events") (e.g., the web app may want to know if a payment went through successfully); any service level agreements (SLAs) (e.g., how long does the UI component take to render on the user's browser); accessibility compliance details (e.g., whether the UI component certifies itself to be compliant with ADA/WCAG/508 accessibility standards); whether the child web application 151-154 supports server side rendering); links to dashboard (e.g., NewRelic or grafna links) where developers may find coding or business errors and metrics reported by the child web application 151-154; whether the component can be embedded in a Progressive Web Application (PWA) that allows developers to compile the website as a native mobile application; whether the component uses service works (e.g., Web Workers) to offload heavy data fetching and/or processing in the user's browser; and/or any other attributes or properties of child web applications 151-154. Thus, the component registry database 160 may define rules for each respective child web application 151-154 the web application 140 and/or host web application 141 may use to determine if the web application 140 and/or host web application 141 may obtain the code for a respective child web application 151-154 for a given context (e.g., based on user interaction with the web application 140).

During runtime, the web application 140 and/or host web application 141 may insert the code for a respective child web application 151-154 into the DOM of the web application 140 and/or host web application 141, as detailed above. Thus, each application component 150 (e.g., child web application 151-154) may be developed and deployed independently and may be served on-demand as a micro-frontend, micro-application, or other type of application component. Accordingly, web application 140 and/or host web application 141 may build the website at runtime using the component registry database 160.

Figure 3:
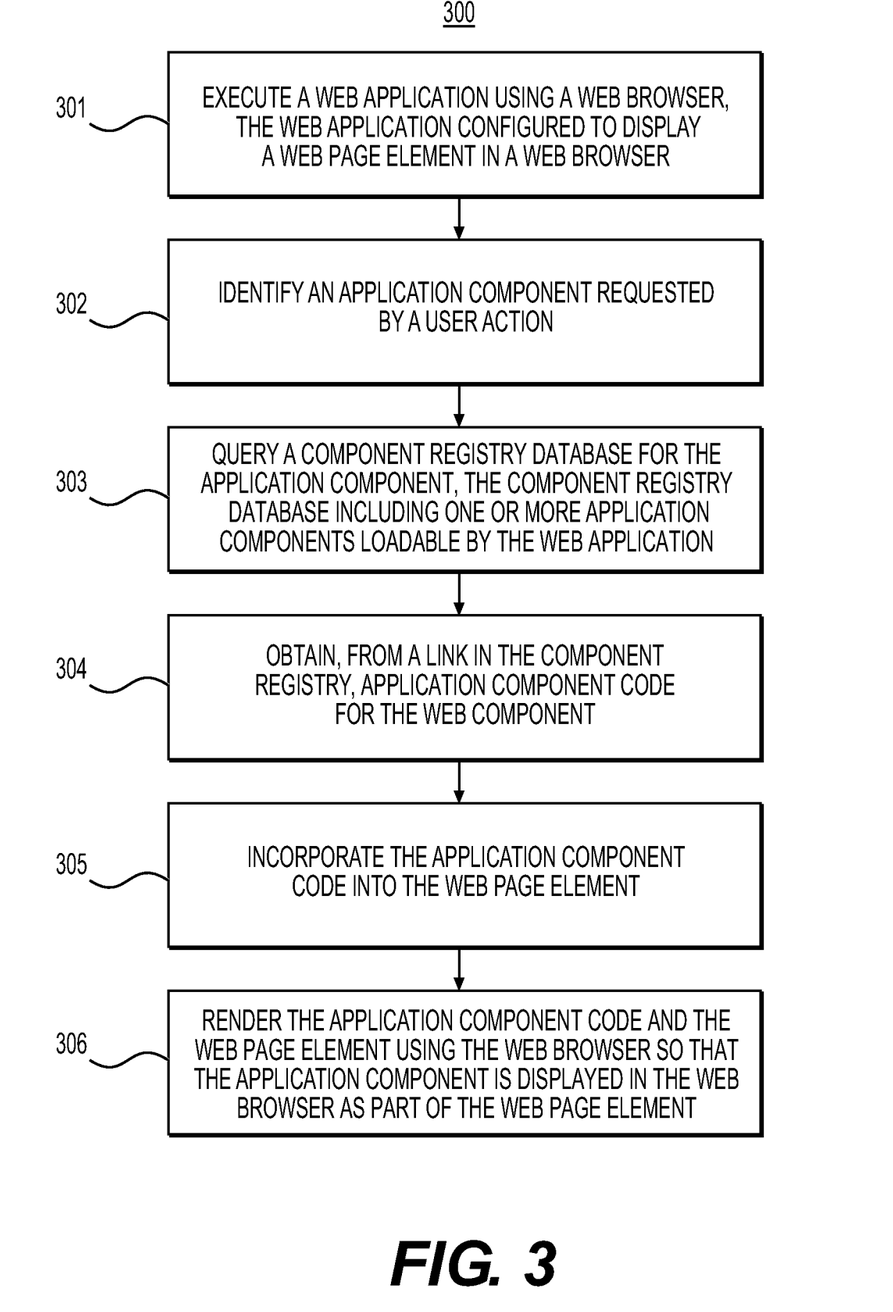
FIG. 3 is a flowchart illustrating a method for presenting web application content, according to one or more embodiments.

FIG. 3 is a flowchart illustrating a method 300 for presenting web application content. The method may be performed by client device 102. In some embodiments, client device 102 may be configured to perform the method by executing instructions. Such instructions may be stored in any suitable computer-readable medium. The method illustrated by FIG. 3 may incorporate any of the techniques and methodologies discussed above in connection with FIGS. 1-2C, where context permits.

Step 301 may include executing a web application 140 using a web browser 110, the web application 140 configured to display a web page element (e.g., via a DOM) in a web browser 110.

Step 302 may include identifying an application component 150 requested by a user action. The application component 150 may be child web applications 151-154 (e.g., micro-frontends, micro-applications, etc.), as described above in connection with FIGS. 1-2C. For example, the user action may be an initial page load request (e.g., via a URL of the web application 140 and/or host web application 141), and/or interaction with the web application 140 that indicates a particular application component 150 to be loaded and/or displayed. The user action may also be indicative of a URL including a child web application identifier that identifies child web application 151-154, and may be a command to navigate the web browser 110 to the URL. Identification of the child web application 151-154 may include identifying the child web application 151-154 based on the child web application identifier.

Step 303 may include querying a component registry database 160 for the application component 150, as detailed above. The component registry database 160 may include one or more application components 150 loadable by the web application 140. For example, the component registry database may include a list of application components 150 that can be used by the web application 140 and/or host web application 141, as detailed above. Accordingly, each respective application component 150 in the list of application components 150 may include one or more attributes and/or properties associated with the respective application component 150. The one or more attributes may include features and/or rules associated with the application component 150 that define whether the web application 140 can use the application component 150. For example, the one or more attributes may include one or more of: versions of the application component 150 that are available, a URL associated the application component code, rules for passing data to and from the application component 150, any SLAs for the application component 150, accessibility compliance information associated with the application component 150, rules for server side rendering associated with the application component 150, links for a metrics dashboard associated with the application component 150, rules for whether the application component 150 can be embedded in a progressive web application, and/or rules for whether the application component 150 uses service workers to offload heavy data fetching.

Step 304 may include obtaining, via a link in the component registry database 160, application component code of the identified application component 150. For example, the application component code may include child web application code 151-154 for a respective child web application stored by server system 104, as detailed above.

Step 305 may include incorporating the application component code into the web page element. For example, web application 140 and/or host web application 141 may replace at least a portion of a document object model of the web application 140 and/or host web application 141 with the application component code, as detailed above.

Step 306 may include rendering the application component code and the web page element using the web browser 110, so that the application component 150 is displayed in the web browser 110 as part of the web page element.

In some embodiments, the application component 150 may be a first application component 150, and the method 300 may include identifying a second application component 150 requested by a second user action. The method 300 may include displaying the second application component 150 in the web browser 110 as part of the web page element, as detailed above. For example, the web application 140 and/or host web application 141 may query the component registry database 160 for the second application component 150. The web application 140 and/or host web application 141 may then obtain the second application component code from a link in the component registry database 160. The web application 140 and/or host web application 141 may then incorporate the second application component code into the web page element. The web application 140 and/or host web application 141 may then render the second application component code and the web page element using the web browser 110 so that the second application component 150 is displayed in the web browser 110 as part of the web page element.

In some embodiments, the application component 150 may include a plurality of application components 150. The method 300 may include querying the component registry database 160 for the plurality of application components 150. The method 300 may also include identifying each of the plurality of application components 150 in the component registry database 160 based on the one or more attributes associated with each of the plurality of application components 150. The method 300 may also obtaining, from a link in the component registry database 160, application component code for each of the plurality of application components 150.

It is noted that, in general, the methods illustrated by FIG. 3 may incorporate any of the techniques and methodologies discussed above in connection with FIGS. 1-2C, wherever context permits. Further, it is noted that while web application 140 and/or host web application 141 and child web applications 151-154 are referred to as web applications in various embodiments, the teachings herein may also be applied to other types of applications. Therefore, web application 140 and/or host web application 141 and child web applications 151-154 may, in general, also be referred to as applications that run on client device 102.

In general, any method discussed in this disclosure that is understood to be computer-implementable, such as the methods described in connection with FIG. 3, may be performed by one or more processors of a computer system, such as client device 102 and/or server system 104, as described above. A method or method step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as client device 102 and/or server system 104, may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 4:
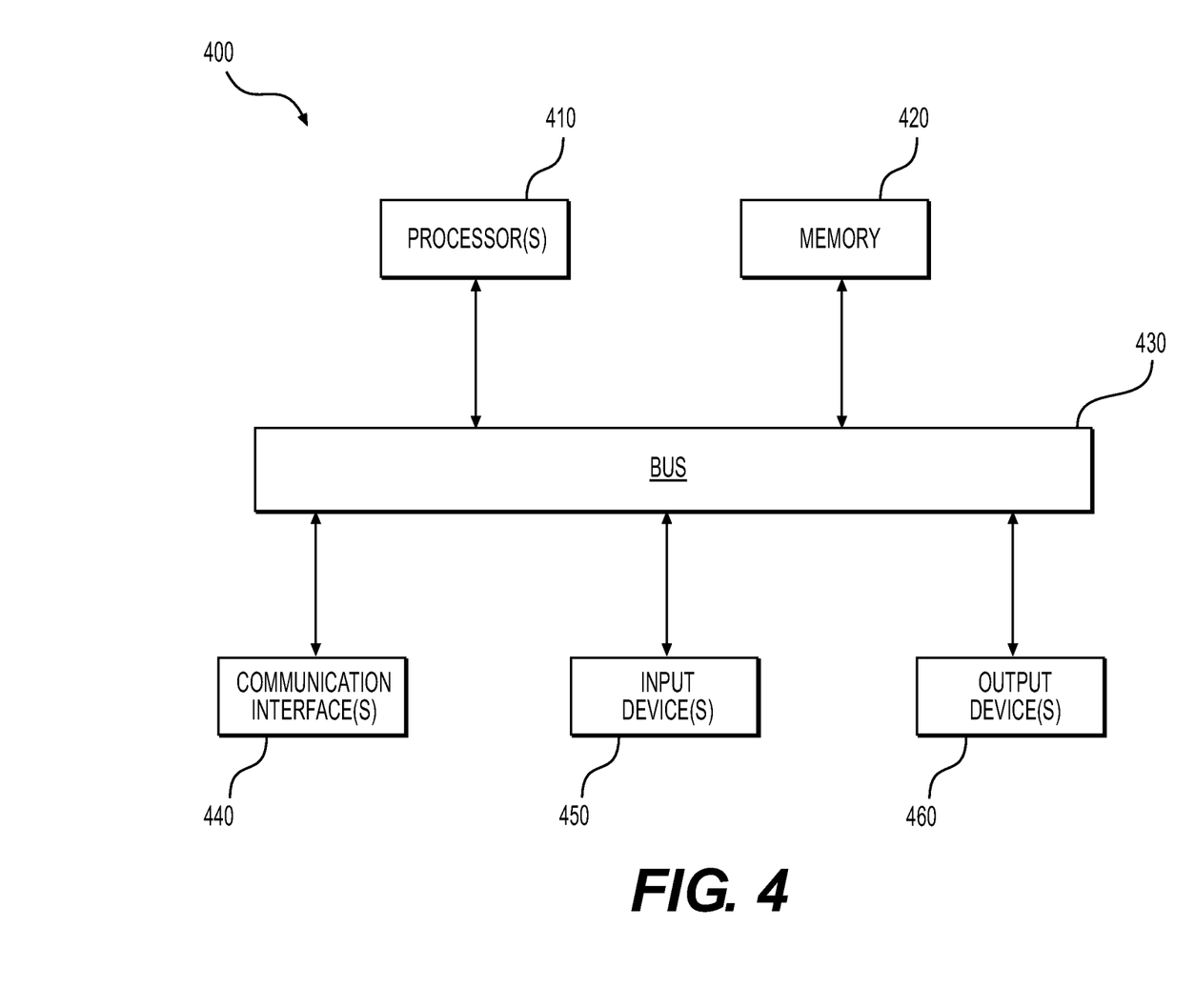
FIG. 4 illustrates a computing device, according to one or more embodiments.

FIG. 4 illustrates an example of a computing device 400 of a computer system. The computing device 400 may include processor(s) 410 (e.g., CPU, GPU, or other processing unit), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted. The scope of the invention should be determined not by the embodiments illustrated, but by the appended claims and their equivalents.

What is claimed is:

1. A method for presenting web application content, the method comprising:
    executing a web application using a web browser, the web application configured to display a web page element in a web browser;
    identifying an application component requested by a user action;
    querying a component registry database for the requested application component, the component registry database including one or more application components loadable by the web application and one or more attributes associated with each respective application component, the one or more attributes including at least a link comprising a uniform resource location (URL) associated with application component code for the respective application component;
    obtaining, using the link from the one or more attributes associated with the requested application component in the component registry database, the application component code for the requested application component;
    incorporating the application component code into the web page element; and
    rendering the application component code and the web page element using the web browser so that the requested application component is displayed in the web browser as part of the web page element.

2. The method of claim 1, wherein the component registry database includes a list of application components that can be used by the web application.

3. The method of claim 2, wherein the one or more attributes associated with each respective application component further include one or more of: versions of the application component that are available, rules for passing data to and from the application component, any service level agreements (SLAs) for the application component, accessibility compliance information associated with the application component, rules for server side rendering associated with the application component, links for a metrics dashboard associated with the application component, rules for whether the application component can be embedded in a progressive web application, and/or rules for whether the application component uses service workers to offload heavy data fetching.

4. The method of claim 1, wherein the requested application component includes a plurality of application components, and the method further includes:
    querying the component registry database for the plurality of application components;
    identifying each of the plurality of application components in the component registry database based on the one or more attributes associated with each of the plurality of application components; and
    obtaining, using the respective link from the one or more attributes associated with each of the plurality of application components in the component registry database, application component code for each of the plurality of application components.

5. The method of claim 1, wherein the one or more attributes associated with each respective application component further include features and/or rules associated with the application component that define whether the web application can use the application component.

6. The method of claim 1, wherein the requested application component is a micro-application or a micro-frontend.

7. The method of claim 1, wherein incorporating the application component code into the web page element includes replacing at least a portion of a document object model of the web application with the application component code.

8. The method of claim 1, wherein the requested application component is a first application component of the one or more application components, and the method further includes:
identifying a second application component of the one or more component applications requested by a second user action; and
displaying the second application component in the web browser as part of the web page element.

9. The method of claim 8, further including:
querying the component registry database for the second application component;
obtaining, using a second link from the one or more attributes associated with the second application component in the component registry database, second application component code for the second application component;
incorporating the second application component code into the web page element; and
rendering the second application component code and the web page element using the web browser so that the second application component is displayed in the web browser as part of the web page element.

10. The method of claim 1, wherein:
the user action is indicative of a route including an application component identifier, and
identifying the application component requested by the user action includes identifying the requested application component based on the application component identifier.

11. The method of claim 10, wherein the user action is a command to navigate the web browser to the route.

12. The method of claim 1, wherein the requested application component includes a plurality of application components, and the link from the one or more attributes associated with the requested application component includes a link to a bundle of the plurality of application components, the bundle comprising the application component code for each of the plurality of application components packaged in a single file.

13. A method for presenting web application content, the method comprising:
executing a web application using a web browser, the web application configured to display a web page element in a web browser;
identifying one or more application components requested by a user action, the one or more application components including one or more micro-applications and/or one or more micro-frontends;
querying a component registry database for the requested one or more application components, the component registry database including a list of one or more application components loadable by the web application, wherein each respective application component of the list includes one or more attributes associated with each respective application component, and the one or more attributes include at least a link comprising a uniform resource location (URL) associated with application component code for each respective application component;
obtaining, using the link from the one or more attributes associated with the requested one or more application components in the component registry database, the application component code for each of the requested one or more application components;
incorporating the application component code for each of the requested one or more application components into the web page element; and
rendering the application component code and the web page element using the web browser so that the requested one or more application components are displayed in the web browser as part of the web page element.

14. The method of claim 13, wherein at least one of the requested one or more application components includes a plurality of application components, and, for the at least one of the requested one or more application components, the method further includes:
querying the component registry database for the plurality of application components;
identifying each of the plurality of application components in the component registry database based on the one or more attributes associated with each of the plurality of application components; and
obtaining, using the respective link from the one or more attributes associated with each of the plurality of application components in the component registry database, application component code for each of the plurality of application components.

15. The method of claim 13, wherein the one or more attributes associated with each respective application component further include features and/or rules associated with the application component that define whether the web application can use the application component.

16. The method of claim 13, wherein the one or more attributes associated with each respective application component further include one or more of: versions of the application component that are available, rules for passing data to and from the application component, any service level agreements (SLAs) for the application component, accessibility compliance information associated with the application component, rules for server side rendering associated with the application component, links for a metrics dashboard associated with the application component, rules for whether the application component can be embedded in a progressive web application, and/or rules for whether the application component uses service workers to offload heavy data fetching.

17. The method of claim 13, wherein incorporating the application component code of each of the requested one or more application components into the web page element includes replacing at least a portion of a document object model of the web application with the application component code of each of the requested one or more application components.

18. The method of claim 13, wherein the requested one or more application components include a first application component of the one or more application components included in the list, and the method further includes:
identifying a second application component of the one or more application components included in the list requested by a second user action; and
displaying the second application component in the web browser as part of the web page element.

19. The method of claim 18, further including:
querying the component registry database for the second application component;
obtaining, using a second link from the one or more attributes associated with the second application component in the component registry database, second application component code for the second application component;

incorporating the second application component code into the web page element; and rendering the second application component code and the web page element using the web browser so that the second application component is displayed in the web browser as part of the web page element.

20. A computer system for presenting web application content, the computer system comprising:

at least one memory storing instructions; and at least one processor configured to execute the instructions to perform operations including:

receiving, from a client device, a page load request;

transmitting, to the client device, a web application, the web application being executable in a web browser of the client device, the web application configured to display a web page element in a web browser, wherein the web application, when executed in the web browser of the client device, configures the client device to identify an application component when the application component is requested by a user action performed by a user of the web browser;

receiving, from the client device, a query of a component registry database for the requested application component, the component registry database including one or more application components loadable by the web application and one or more attributes associated with each respective application component, the one or more attributes including at least a link comprising a uniform resource location (URL) associated with application component code for the respective application component; and transmitting, to the client device, application component code for the application component obtained using the link from the one or more attributes associated with the requested application component in the component registry database, wherein the web application, when executed in the web browser of the client device, further configures the client device to:

incorporate the application component code into the web page element; and render the application component code and the web page element using the web browser so that the requested application component is displayed in the web browser as part of the web page element.

* * * * *